Oct. 12, 1954
F. SANDRI
2,691,219
REMOVABLE DENTAL PROSTHESIS AND
ANCHORING DEVICE THEREFOR
Filed April 7, 1953
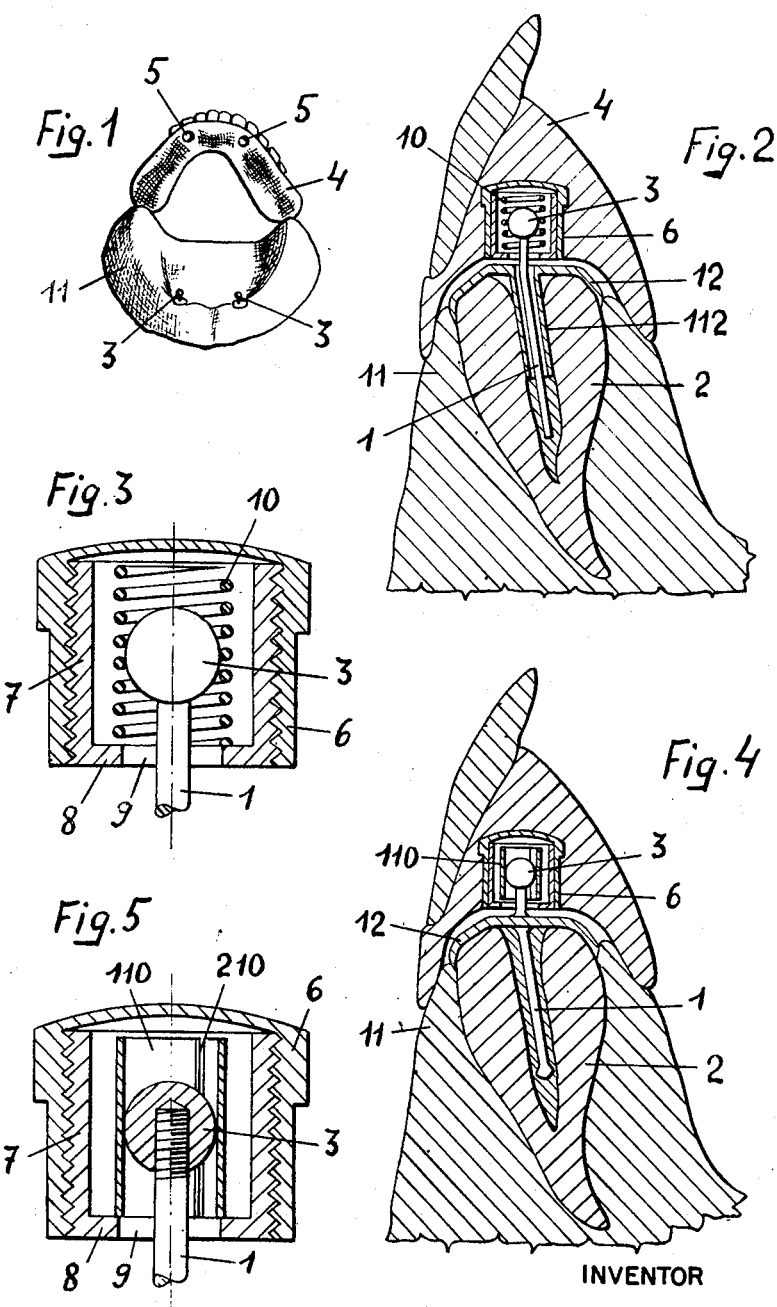
INVENTOR
FRANCO SANDRI
by Toulmin & Toulmin
ATTORNEYS Patented Oct. 12, 1954

2,691,219

UNITED STATES PATENT OFFICE 2,691,219

REMOVABLE DENTAL PROSTHESIS AND ANCHORING DEVICE THEREFOR

Franco Sandri, Genoa, Italy

Application April 7, 1953, Serial No. 347,307

Claims priority, application Italy May 5, 1952

10 Claims. (Cl. 32—5)

This invention relates to means for removably attaching a dental prosthesis (which term shall include both complete denture sets and bridges) to metal pins fixed to existing teeth stumps or preferably in the root canal. Such pins terminate with a ball head projecting above the alveolar ridge and are adapted to be removably inserted in metal collars or bushings fastened to the prosthesis.

The object of the invention is in the first place to provide an improved ball joint for removably attaching the prosthesis to one or more pins fixed to existing teeth or roots in such a manner as to permit to accomplish during the mastication slight movements in all directions and to relieve the pillar root from hurtful stresses.

A further object of the invention is to provide a ball joint for a dental prosthesis anchored to pins and which is simple and safe, which permits an easy attaching and removing of the prosthesis and whose parts may be easily changed and cleaned.

According to the invention, the anchoring pins fixed to stumps of existing teeth or preferably in the root canal, where they are cemented in a suitable manner, terminate outwardly with a ball head and constitute, together with a capping of the root, the fixed part of the prosthesis.

The removable prosthesis, on the other hand, is provided with suitably wide bores and with retaining means for a cylindrical resiliently yielding member which, once inserted, cannot come out of the bore without removing the said retaining member thereof, but is only allowed to accomplish slight movements therein.

Said retaining member however has a hole of such a width as to permit to the ball head of the said pin of snugly passing therethrough and engaging itself into the bore of said cylindrical resilient member, which is slightly resiliently expanded thereby.

By this arrangement temporary movements of the prosthesis are permitted during the mastication. On the other hand the sliding connection between the ball head and the cylindrical resilient member permits adjustments of the prosthesis to increased shrinking of the edentulous gum which resiliently supports the prosthesis.

The above and other features and advantages of the invention will be apparent from the following specification of some preferred embodiments shown by way of example in the attached drawing in which:

Figure 1 is a diagrammatic view of a jaw in which only two tooth roots are left, which are provided each with a ball-headed pin for holding a complete denture set, also shown in bottom plan.

Figure 2 shows in section a denture anchored to a ball-headed pin by means of a device according to the invention.

Figure 3 shows enlarged a detail of Fig. 2.

Figures 4 and 5 show in section a further embodiment of the device and detail thereof, in enlarged scale.

Referring to the drawing, the device for anchoring a dental prothesis according to the invention comprises a fixed part, constituted by one or more pins each fixed to tooth stump or root and a movable part attached to the prosthesis.

In the embodiments as shown in the drawings, the pins 1 are shown as fixed by cementing in the canal of the roots 2 and are provided with a ball-shaped head 3 projecting above the alveolar ridge.

The dental prosthesis 4, which may be a complete denture set (as shown in Figure 1) or a bridge, presents in correspondence of each pin 1 a blind bore 5 in which a metal cap 6 is fixed substantially at right angles to the alveolar ridge.

Said cap 6 is open at its outer end and is provided with a screw thread in which another cap 7 with perforated bottom 8 may be screwed. Thus caps 6 and 7 define a cylindrical chamber provided with an axial hole 9 which is of such a diameter as to permit of ball head 3 passing therethrough, together with a part of pin 1.

In said chamber defined by members 6, 7 and 8 a cylindrical resilient member 10 (Figs. 2 and 3) or 110 (Figs. 4 and 5) is arranged co-axially, so as to be slightly shiftable in axial and transversal directions, but is of such an outside diameter, as not to come out of the hole 9. The inside diameter is however such as to permit of the ball head 3 being inserted therein with a slight frictional pressure by slightly expanding its walls. For this purpose, as shown, said cylindrical member may be either in the form of a helical spring 10, Figures 2 and 3, (in which however the convolutions are much more close together than as shown) or also in the form of a sleeve or small tube 110 split longitudinally as at 210 (Figures 4 and 5).

The anchoring of the prosthesis 4 is effected by simply inserting each ball head 3 through a corresponding hole 9 and into the resilient member 10 in Figures 2 and 3, or 110 in Figures 4 and 5 until the saddle base of the prosthesis bears on the underlying gum 11 (Figures 2 and 4).

During the mastication, the prosthesis 4 is permitted all necessary slight movements, in relation to pillar root 2, which are useful in relieving this latter from detrimental stresses, and this inasmuch as the prosthesis is actually supported by the edentulous gum 11 which acts also as cushioning means.

In addition to these movements the device permits a permanent shifting of the ball head 3 along the cylindrical member 10 in Figures 2 and 3, or 110 in Figures 4 and 5 to adjust the prosthesis to the shrinking of the edentulous gum. This adjusting movement is braked by the friction existing between member 10 in Figures 2 and 3, or 110 in Figures 4 and 5 and the ball head 3 and is independent from the movements which take place during the mastication.

In the usual techniques, the pin 1 is usually welded to the root capping 12 as shown in Figure 4. Now, if the pin is provided with a fixed head 3, this may lead to deformation of said head. In order to avoid this, either the capping 12 may be provided with a tubular extension 112, Fig. 2 and the pin 1 may be directly cemented into the root canal independently from the root capping, or it may be soldered to said tubular extension of the root capping or also the ball head 3 may be removable and attached to the theaded pin end 1 by screwing, as shown in Figure 5.

Although the fixed part of the dental prosthesis has been shown fixed in a tooth canal, of course the headed pin might be fastened also to some member projecting for example from dental cappings. These and other variations will not depart from the principle on which the present improvements are based, as set out in the following claims.

I claim:

1. In combination, a removable dental prosthesis and an anchoring device therefor, said anchoring device comprising a pin adapted for being fixed to a natural tooth part in position to project above the alveolar ridge, an enlarged head on the projecting end of said pin, said removable prosthesis being adapted to be fitted on the edentulous part of the gums and to be anchored to said pin, a vertical blind bore provided in a bottom part of said removable prosthesis to receive the projecting part of said pin, means removably mounted in said bore having a wall closing the lower end of said bore and defining with said bore a chamber, said wall being provided with a hole having a diameter slightly greater than that of the said head on the end of said pin, a cylindrical hollow spring member enclosed in said chamber substantially coaxially therewith, said spring member having an outer diameter that is smaller than that of the chamber, but larger than that of the said hole, while the inner diameter of the spring member is smaller than that of the said hole and of such a size as to slidably engage the said head on the pin under substantial friction.

2. An arrangement according to claim 1 in which the said cylindrical hollow spring member comprises a coil spring.

3. An arrangement according to claim 1 in which the said cylindrical hollow spring member comprises an axially split sleeve of resilient material.

4. An arrangement according to claim 1 in which the said pin is adapted for being cemented into a canal in the said tooth part.

5. An arrangement according to claim 1 in which a cap is provided for covering the upper end of said tooth part.

6. An arrangement according to claim 5 in which the said cap covering the upper end of the tooth part is integral with said pin.

7. An arrangement according to claim 5 in which the said cap covering the upper end of the tooth part is provided with a tubular extension adapted for fitting the root canal of the said tooth part and through which the said pin freely passes.

8. An arrangement according to claim 1 in which there is a cap open at the bottom mounted in said blind bore and the said means removably mounted in said bore comprising a second cap fitted within the cap that is mounted in said bore.

9. An arrangement according to claim 8 in which the cap in the bore is internally threaded and the second cap is externally threaded and the said second cap is screwed into the cap in the bore.

10. An arrangement according to claim 1 in which the said enlarged head is in the form of a ball and is detachably mounted on the end of said pin.

References Cited in the file of this patent

UNITED STATES PATENTS

| Number | Name | Date |
|---|---|---|
| 583,565 | Carr | June 1, 1897 |
| 1,101,810 | Otrich et al. | June 30, 1914 |
| 2,112,007 | Adams | Mar. 22, 1938 |